(12) United States Patent
Oehler et al.

(10) Patent No.: US 9,423,489 B2
(45) Date of Patent: Aug. 23, 2016

(54) NEAR FIELD NAVIGATION SYSTEM

(75) Inventors: Veit Oehler, Neubiberg (DE); Michael Voith Von Voithenberg, Munich (DE); Julian Steffes, Munich (DE)

(73) Assignee: Astrium GmbH, Taufkirchen (DE)

( * ) Notice: Subject to any disclaimer, the term of this patent is extended or adjusted under 35 U.S.C. 154(b) by 492 days.

(21) Appl. No.: 13/491,668

(22) Filed: Jun. 8, 2012

(65) Prior Publication Data
US 2012/0326923 A1 Dec. 27, 2012

(30) Foreign Application Priority Data
Jun. 10, 2011 (EP) .................................. 11004758

(51) Int. Cl.
| | |
|---|---|
| G01S 13/08 | (2006.01) |
| G01S 5/14 | (2006.01) |
| G01S 5/02 | (2010.01) |
| G01S 5/16 | (2006.01) |
| G01S 19/48 | (2010.01) |

(52) U.S. Cl.
CPC ............... *G01S 5/14* (2013.01); *G01S 5/0284* (2013.01); *G01S 5/16* (2013.01); *G01S 19/48* (2013.01)

(58) Field of Classification Search
CPC .......... G01S 5/02; G01S 5/14; G01S 5/0284; G01S 5/16; G01S 19/48
USPC .......................................................... 342/139
See application file for complete search history.

(56) References Cited

U.S. PATENT DOCUMENTS

| | | | |
|---|---|---|---|
| 3,760,875 A | 9/1973 | Busking | |
| 4,853,863 A | 8/1989 | Cohen et al. | |
| 5,365,516 A * | 11/1994 | Jandrell | 370/335 |
| 6,067,039 A * | 5/2000 | Pyner et al. | 342/125 |
| 6,072,433 A * | 6/2000 | Young et al. | 342/386 |
| 8,000,721 B2 * | 8/2011 | Hanner | G01C 21/08 455/41.1 |
| 2005/0046608 A1 * | 3/2005 | Schantz et al. | 342/127 |
| 2005/0215269 A1 * | 9/2005 | Cheok et al. | 455/456.1 |
| 2007/0217379 A1 | 9/2007 | Fujiwara et al. | |
| 2011/0221635 A1 * | 9/2011 | Wang | G01S 5/0242 342/463 |

OTHER PUBLICATIONS

Extended European Search Report dated Oct. 8, 2013 (10 pages).
European Search Report dated Oct. 31, 2011 (Seven (7) pages).

* cited by examiner

*Primary Examiner* — Frank J McGue
(74) *Attorney, Agent, or Firm* — Crowell & Moring LLP

(57) ABSTRACT

A near field navigation system is equipped with a base segment provided on a base structure. The base segment includes at least four transmitters. Each transmitter is provided with a base antenna and the base antennas are positioned relative to each other at known distances. A user segment is provided on a user structure, the user segment including at least one receiver, at least one user antenna connected to the receiver, and a processing unit connected to the receiver. The receiver and each of the transmitters together form distance measuring units and the processing unit is adapted to calculate the relative three-dimensional position data of the user structure with respect to the base structure on the basis of distance data obtained from the distance measuring units.

14 Claims, 8 Drawing Sheets

HP-HLS Functional Block Digram

NEAR FIELD NAVIGATION SYSTEM

The present invention is directed to a near field navigation system and in particular to a concept and methodology enabling high precision three-dimensional positioning and attitude determination relative to locally deployed transmitters through distance measuring, for consideration as fix installed or mobile navigation system.

FIELD OF THE INVENTION

The invention relates to a near field navigation system and to a concept and method enabling high precision three-dimensional navigation and attitude determination relative to a set of locally deployed transmitters by considering relevant distance information, allowing for local navigation of moving vehicles or objects relative to a fixed or moving set of transmitters until touchdown or final position arrival. It also includes a concept how to properly design and implement the invention as local navigation system. Furthermore, a method on how to combine the invention with a global navigation satellite system (GNSS) extending the range of the invented navigation to a global scale and a concept on how to integrate the ground and user elements into available standard equipment are part of this invention. Finally, a compact and clear visualization for the object or vehicle operator, pilot, co-pilot, flight officer, or in case of a remote controlled (RC) object for the ground operator, suitable for the invention's navigation information and a concept and method to extend the field of application of the local navigation system to mobile missions are addressed in this invention.

BACKGROUND OF THE INVENTION

Standard global navigation satellite systems (GNSS) such as GPS, GLONASS, or the future European Galileo system provide suitable positioning information enabling worldwide a determination of position, velocity and time with a good accuracy, depending on the available GNSS information and services (civil signals service, military or public signals service, etc.). The GNSS signals enable distance computation between receiver and transmitter within the standard Radio Navigation Satellite Service (RNSS) that allows for three-dimensional navigation if at least four ranges to different satellites are available, and if the locations of these satellites are a priori known.

Due to various effects between signal source and the receiver, the range computation might suffer from the following effects: inaccurate satellite location modeling, signal delays due to atmospheric effects, local reception effects like multipath, etc., especially over the large distance between GNSS satellites in orbit and user receivers on the ground, the geometrical range is only estimated with an accuracy that is degraded by the mentioned error contributions. Depending on the available signals from the GNSS services and on the local environment of the user, the range can be estimated within an accuracy of 1 to 3 meters, but due to the above described issues also errors higher than 20 to 30 meters are likely to occur. Such range information accuracy typically allows for a three-dimensional localization accuracy in the order of 10 m in absolute earth inertial coordinates.

Such a positioning performance sufficiently supports many applications or services, like car navigation or even airplane en-route navigation, but does not allow for high-accuracy missions that require centimeter-level accuracy, like aircraft or helicopter touch down situations or critical docking maneuvers, etc.

There are ways to improve a GNSS regionally with satellite based augmentation systems (SBAS) like WAAS or EGNOS or locally with local area augmentation systems (LAAS) through reference stations and correction data or Pseudolite consideration. These systems improve the accuracy of the satellite range information and thus the user's positioning performance, but these concepts are either not accurate enough (SBAS), or very complex and expensive to install and to operate (LAAS). Furthermore these complex regional or local GNSS signal based systems only improve the absolute localization of the user, and cannot or only through additional and again very complex system be used in environments respectively for missions where the target (e.g. a helicopter landing platform) is moving and/or is even changing its attitude.

Exemplary embodiments of the present invention provide locally restricted and suitable distance information from locally distributed and temporarily relative to each other fixed (at least fix for mission duration) transmitters allowing for highly accurate relative localization.

SUMMARY OF THE INVENTION

This near field navigation system of the invention is equipped with a base segment provided on a base structure, the base segment comprising at least four transmitters, wherein each transmitter is provided with a base antenna and wherein the base antennas are positioned relative to each other at known distances; a user segment provided on a user structure, the user segment comprising at least one receiver, at least one user antenna connected to the receiver, and a processing unit connected to the receiver; wherein the receiver and each of the transmitters form together distance measuring units and wherein the processing unit is adapted to calculate the relative three-dimensional position data of the user structure with respect to the base structure on the basis of distance data obtained from the distance measuring units.

The drawback of typical GNSS navigation systems is avoided by using the locally deployed transmitters that are providing suitable information for distance computation to an approaching vehicle or object. This significantly reduces the error contributions due to far smaller distances, allows for relative user localization to the set of transmitters and thus also supports moving platform missions. This invented near field navigation system also allows for user orientation relative to the transmitter set if the signals are received by more than one antenna installed at the user. By feeding the user segment with attitude information, e.g., by means of an inertial unit, the orientation and attitude of static or even moving deployed set of transmitters can be determined relative to each other in order to visualize beside the relative position and speed also the relative attitude between two moving objects. Also the locally used signals are not limited to GNSS frequencies anymore.

In a preferred embodiment the user segment comprises at least three receivers wherein each receiver is provided with one of the user antennas and wherein the receivers are connected to the processing units. The advantage of obtaining a user orientation information is enhanced when each one of the user antennas is connected to an own receiver. The provision of one antenna allows position determination, with two antennas the heading can be determined, and the provision of three antennas enables attitude determination.

It is also advantageous when the transmitters are RADAR transmitters, when the at least one receiver is a RADAR receiver and/or when the distance measuring units are RADAR-based distance measuring units. The local allocation of the transmitters allows using other frequency bands than those used by a GNSS system. Consequently, it is advantageous to use RADAR frequencies that allow an easy and reliable distance measurement. Instead of RADAR frequencies LIDAR or LASER distance measurement can also be implemented into the inventive near field navigation system. Using RADAR or LIDAR frequencies as well a LASER system improves the distance measurement accuracy and/or minimizes the complexity of the ground segment. Known GNSS transmitters and pseudolites (pseudo-satellite navigation systems) are very complex, whereas RADAR transmitters are flexible, fast and easily installed due to a small and light hardware. The frequency band selection and the transmitter selection can be driven by cost and complexity limitation reasons, mobility aspects, distance measurement accuracy and local error source characteristics or mission needs, e.g., the level of accuracy and integrity.

In another preferred embodiment at least a first one of the transmitters is provided with an inter-transmitter distance measuring unit that is adapted to determine the distance between the antenna of the first transmitter and the antenna of at least one other transmitter of the base segment, wherein the at least one transmitter is adapted to transmit the determined distance data to the receiver of the user segment. This preferred embodiment allows a high precision self calibration of the base segment. In particular if a sufficient number of transmitters is provided with such an inter-transmitter distance measuring unit it is possible to automatically detect all distances between the transmitters of the base segment and to transmit this distance information to the processing unit of the user segment.

Preferably, the inter-transmitter distance measuring unit of the at least one transmitter is a RADAR-based distance measuring unit. Of course, it is also possible to use LIDAR-based distance measuring units or LASER-based distance measuring units for measuring the inter-transmitter distances.

In a further preferred embodiment the base segment comprises an inter-transmitter distance measuring control unit that controls the inter-transmitter distance measuring unit(s) and wherein the control unit is preferably provided in one of the transmitters, which thus forms a master transmitter adapted to transmit the determined inter-transmitter distance data to the user segment. Such a provision of a master transmitter forms an autonomous base segment with a self-calibration ability.

Further preferably, each one of the transmitters of the base segment is provided with a satellite navigation unit, wherein the absolute position data of each transmitter obtained from the satellite navigation units are transmitted to the user segment. This additional satellite navigation information for each one of the transmitters allows, together with the near field navigation information (i.e., the distance measuring information), a highly precise approach of the user segment to the base segment.

It is advantageous when the one transmitter of the base segment is adapted to transmit the determined inter-transmitter distance data together with a radar signal to the user segment. If the near field navigation system does not work in a RADAR frequency but in a LIDAR frequency or with a LASER distance measuring equipment the inter-transmitter distance data may also be transmitted to the user segment together with a LIDAR signal or a LASER signal. Alternatively, the inter-transmitter distance data may also be transmitted to the user segment via a separate communication link which can also work in a different frequency band.

In an advantageous embodiment of the near field navigation system the base segment is provided on the ground or on a mobile vehicle, preferably on a naval vessel.

It is also advantageous when the user segment is provided on a mobile vehicle, preferably on a helicopter, on a naval vessel or on an aircraft, in particular an unmanned aerial vehicle (UAV). It is thus possible with the near field navigation system according to the present invention to realize a highly precise automatic approach system for the take-off and approach of a moving object to another object which either can be ground-based or can also be moving, for example the approach of two ships or the approach of an aircraft (helicopter or UAV) to a landing platform on a ship.

In a further preferred embodiment of the invention each transmitter of the base segment is powered by an autonomous power supply, e.g., a battery. This autonomous power supply of the base segment transmitters particularly advantageous in combination with the self-calibration ability of the base segment thus ensuring to support mobile missions.

In a further preferred embodiment of the present invention the base segment and/or the user segment are/is provided with at least one additional position detecting unit, preferably an altimeter unit and/or an inertial measurement unit and/or a global navigation satellite system position detecting unit, wherein the processing unit is adapted to also use the data obtained from the additional position detecting unit for calculating the absolute and/or relative three dimensional position data of the user structure with respect to the base structure.

Through this consideration of additional position detecting units like inertial sensors also the attitude and orientation of both segments, the user segment and the ground segment can be derived. The integration of highly accurate altimeter sensors or units will further improve the accuracy of the near field navigation system according to the invention especially when all base or user antennas are oriented in one plane relative to each other.

In combination with standard global navigation satellite systems the range of the invention can be extended to global areas allowing for an appropriate and accurate approach into the local area of the near field navigation system. Depending on the required accuracy this can be further combined with satellite based augmentation system (SBAS) information or even with ground based augmentation system (GBAS) information.

To limit the impact on standard users as well as on ground infrastructures, the invention ensures fast and easy implementation without the need for complex upgrades of existing equipment, i.e., it is fully compatible with relevant existing standards.

Due to the complexity of the provided information derived by the invention like device location and orientation in relation to the ground segment, absolute location and orientation, relative and absolute velocities, GNSS information and derived location results or height information provided by independent means if implemented, such information is visualized in a compact and clear way without overloading the operator with too much information.

Mobility of the invention in an autonomous configuration through suitable battery and fast self calibration mode consideration is ensured to support mobile missions.

These objects are achieved by methods and concepts enabling relative high precision navigation and attitude determination through general distance information to known relative to each other fixed ground transmitters, suitable concept extension to ensure beside high accuracy near field navigation also a wide range navigation capability, an appropriate concept to design and implement the invention, a suitable concept of GNSS combination, a way to easily integrate the invention into standard equipment with minimum impact, an appropriate visualization of the invention's provided information, and a concept for mobile consideration of the invention.

Exemplary embodiments of the present invention consider suitable distance information between a set of ground transmitters and a set of deployed user antennas to enable local high-precision positioning for any environment including moving base segments. The considered transmit units, the required signals and the distance computation equipment can be selected according to mission needs, e.g., RADAR equipment for highly accurate, fast and easy implementable environments, C-band consideration for more complex scenarios, e.g., missions in a multi-path environment, etc. Thus, the invention is neither limited to dedicated distance computation means (GNSS, RADAR, etc.), nor to dedicated missions like typical aviation consideration for helicopter landing missions, vessel docking scenarios, goods tracking, etc. The technique is usable for all applications were one or two moving objects require a relative position and attitude information to each other.

Through standard interfaces and typically available additional means like internal sensors or altitude data (typically available at least for airborne applications of the invention) the invention can be easily integrated from a ground segment point of view as well as from a user point of view. It provides full navigation system capability until touchdown or reaching of a pre-defined final position. In combination with GNSS (also typically available in airborne scenarios) the vessel or, in general, the object with the user segment can be properly guided into an appropriate distance to the deployed ground transmitters from where the described near field navigation system provides a relevant navigation information like position, velocity, attitude either relative or absolute.

The concept of visualizing all available information provided by the invention either in combination with additional means including GNSS, or without such consideration, is properly implemented in an easy, clear and compact way, and can be displayed at any standard visualization equipment or monitor, either onboard the approaching vehicle or devices, or remotely on ground for appropriate navigation.

The possibility of a very easy design of the invention includes an independent power supply for each unit (e.g., a battery) and an appropriate self calibration functionality to determine the relative position of all ground transmitters or in combination with a GNSS receiver also an absolute position of all ground transmitters. This would allow a fully mobile and flexible operation of the invention, where the transmit units can be quickly released. Within minutes the area can be considered as fully operational near field navigation system providing highly accurate range information for the user segment. Without the need for any additional user upgrade or modification any user already equipped with the invention's user segment can approach the area, and e.g., land its vehicle or dock its vessel.

BRIEF DESCRIPTION OF THE DRAWINGS

The invention will be hereinafter described by example with reference to the drawings in which.

DETAILED DESCRIPTION OF THE DRAWINGS

Due to limited accuracy, standard GNSS solutions cannot be used for missions or scenarios where highly accurate and immediate location and orientation information between two moving objects or a moving and a fixed object, like docking maneuvers between two vessels, or a helicopter approaching a fixed platform or moving flight deck, etc. In combination with local augmentation elements like reference stations, Pseudolites, GBAS, etc. such missions could be supported, but require complex additional infrastructure.

Exemplary embodiments of the present invention provide a near field navigation system and a method that employ locally transmitting suitable distance information that requires two segments: a ground segment and a user segment. Through distance measurements to at least four known transmitters that are received by several antennas that are connected to one receiver, the location and attitude, of a vehicle or device within the service area, can be accurately computed and the device can be guided to a pre defined point accordingly. Depending on the selected distance derivation technology, this enables even mobile consideration of the near field navigation system according to the invention.

Figure 1:
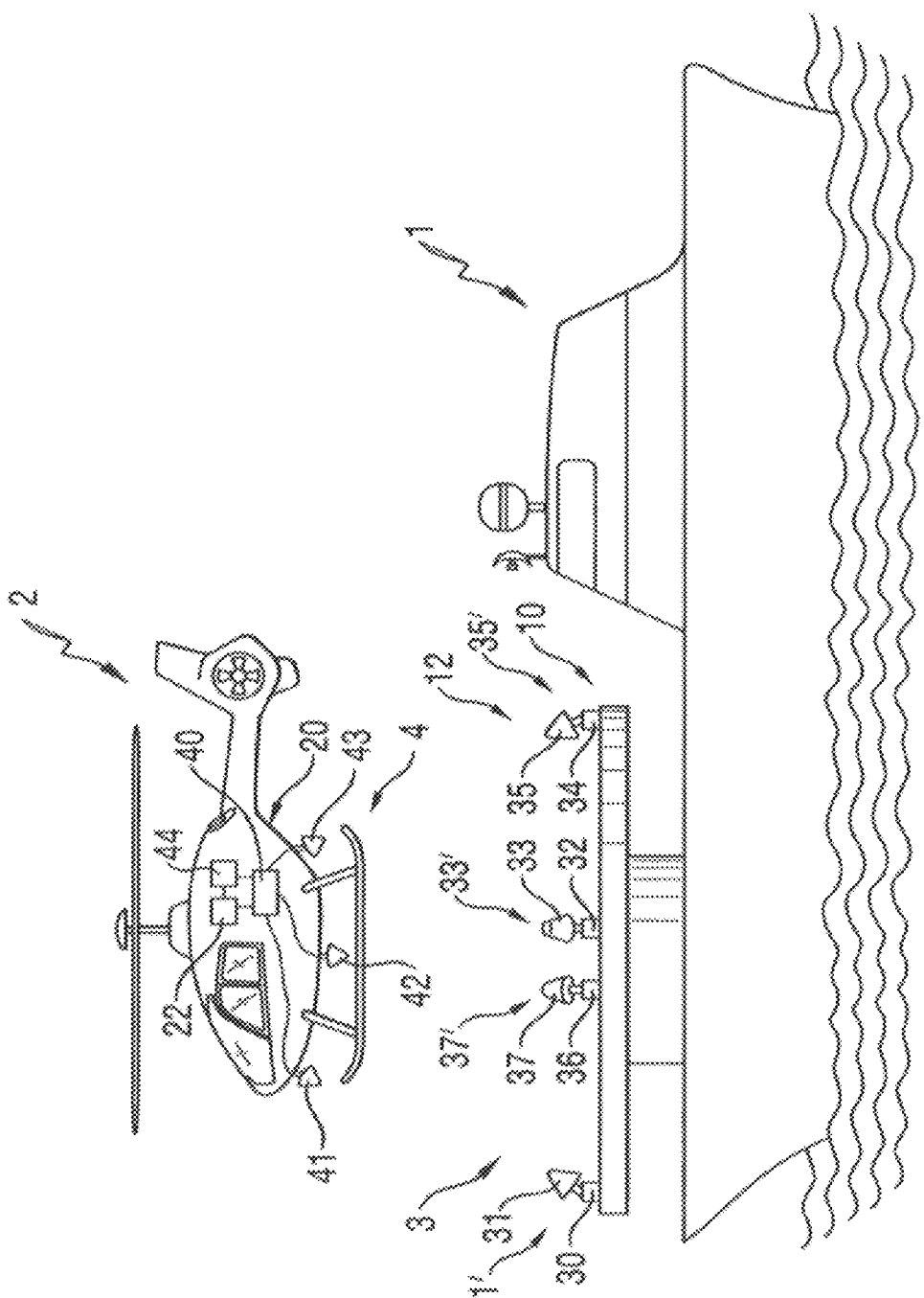
FIG. 1 is a schematic view of a first application example for the near field navigation system according to the invention.

FIG. 1 shows an example of a naval vessel 1 having a helicopter landing deck 10. The helicopter landing deck 10 defines a base structure 12 of a near field navigation system according to the invention.

The helicopter landing deck 10 is provided with at least four RADAR transmitters 30, 32, 34, 36, each of which is provided with a RADAR-antenna 31, 33, 35, 37. These base antennas 31, 33, 35, 37 are positioned relative to each other at known distances. Preferably, each one of the transmitters and the associated antenna form a transmitting unit 31', 33', 35', 37'. The transmitters 30, 32, 34, 36 and the associated antennas 31, 33, 35, 37 define a base segment 3 of the near field navigation system according to the invention.

FIG. 1 also shows a helicopter 2 hovering above the landing platform 10. The helicopter 2 is provided with three RADAR antennas 41, 42, 43 each one defining a user antenna that is connected to a RADAR receiver 40 of the helicopter 2. The user antennas 41, 42, 43 are mounted to the lower side of the helicopter 2 and are positioned relative to each other at different positions. The lower portion of helicopter 2 to which the antennas 41, 42, 43 are mounted defines a user structure 20. Furthermore, the antenna beams of the user antennas 41, 42, 43 are directed into different directions. The user antennas 41, 42, 43 and the receiver 40 define the user segment 4 of the near field navigation system. The helicopter is also provided with a processing unit 44 which is connected to the receiver 40 and preferably also connected to the helicopter's flight computer 22.

Figure 2:
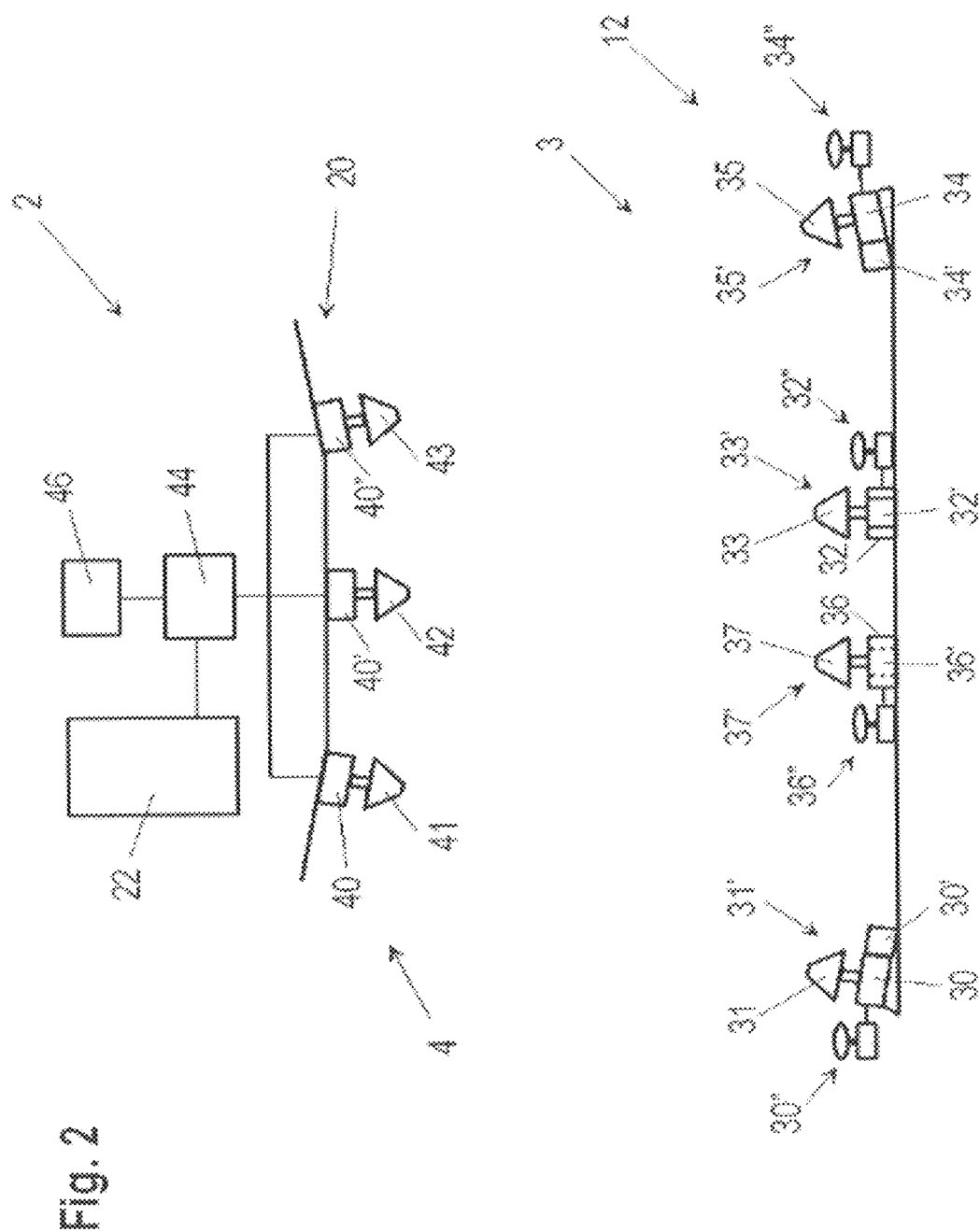
FIG. 2 is a schematic view of an example similar to the one of FIG. 1.

FIG. 2 schematically shows a near field navigation system of the present invention similar to the one shown in FIG. 1. The base segment 3 is provided with the four transmitters 30, 32, 34, 36 and their base antennas 31, 33, 35, 37. Furthermore, a satellite navigation unit 30", 32", 34", 36" is associated with each one of the transmitters 30, 32, 34, 36. These global navigation satellite system receivers 30", 32", 34", 36" allow an absolute position measurement for each one of the transmitting units 31', 33', 35', 37'.

Each of the transmitters 30, 32, 34, 36 is provided with an inter-transmitter distance measuring unit 30', 32', 34', 36'. These inter-transmitter distance measuring units allow an automatic calibration of the base segment 3 because the distances between the base antennas 31, 37, 33, 35 can be automatically detected by these inter-transmitter distance measuring units 30', 32', 34', 36'.

The user segment 4 comprises three user antennas 41, 42, 43 that are located at different locations distant from one another and that are directed in slightly different directions as shown and explained in the example of FIG. 1. However, the example in FIG. 2 shows, as an alternative, the provision of each user antenna 41, 42, 43 with a separate receiver 40, 40', 40". Of course, the example of FIG. 2 can also be equipped with only one receiver like the example in FIG. 1.

Each of the receivers 40, 40', 40" is connected to a processing unit 44 that receives the data from each receiver and in which the distance between the base segment 3 and the user segment 4 or generally the distance between the base structure 12 and the user structure 20, is calculated and thus determined. Also the relative attitude is calculated by the processing unit.

The processing unit further obtains information from an additional position detecting unit 46 that can, for example, be an altimeter or a global navigation satellite system positioning unit. The processing unit 44 is also connected to a flight computer 22. This connection between the processing unit 44 and the flight computer 22 of the user segment 4, e.g., a helicopter or a UAV, allows an autonomous consideration of distance data obtained from the near field navigation system in an automatic piloting system (auto pilot).

To describe the invention's concepts and methodologies, the following sections describe and highlight

- the standard global, regional, and local navigation systems and technical background
- the description of the invented system and the high-level design,
- the architecture, the detailed design, and a possible implementation
- an appropriate way to visualize the information provided by the invention
- a concept how the invention could be as flexible and mobile as possible
- the achievable typical performance of the invention in a suitable RADAR based configuration and
- a list of typical and possible use-cases and services that could be supported by the invention (but not limited to those).

Standard Global, Regional and Local Navigation Systems and Background

Several GNSS already exist today or are under final development or deployment, such as GPS, GLONASS, Galileo, or Compass. Furthermore, other systems are already available to regionally augment the GNSS signals by providing suitable regional correction data for the relevant GNSS (e.g. to support Ionosphere modeling, or to provide integrity information for the specific satellite), such as WAAS, EGNOS, or MSAS (Multi-functional Satellite Augmentation System), which is a Space Based Augmentation Systems (SBAS). Such systems typically achieve around 1 to 5 m ranging accuracy depending on the available signals like single frequency (e.g. GPS L1 C/A code signal), dual-frequency for Ionosphere delay error (e.g., future Galileo E1-E5 combination), or including EGNOS or WAAS Ionosphere modeling parameters. Depending on the local geometry (i.e., the number of visible satellites from user point of view) this would allow for localization accuracy better than 10 m.

To locally improve the performance Ground Based Augmentation Systems (GBAS), are providing from such reference stations locally GNSS error correction information. GNSS transmitters on ground (so called Pseudolites) also improve the local geometry. They can be deployed around a service area to improve the Dilution of Precision and improve by that the localization accuracy even below 1 to 2 m. These systems are, however, rather complex from an installation point of view as well as from an operation point of view. They also require an additional data link between the Pseudolite system and the mobile user, e.g., for correction data reception if not done through Pseudolite technology or Pseudolite messages.

Localization accuracy performance below 10 m or around or below 1 to 2 m would not allow for the high-precision navigation required for various safety critical applications like docking maneuvers or helicopter landing. This is especially true if both platforms or segments (user and ground) are moving. The orientation, neither relative nor absolute can be derived by the above described GNSS, SBAS, or GBAS systems without additional sensors.

The New Local Navigation System Description and Design

Exemplary embodiments of the present invention employ principles similar to GNSS, i.e., the receiver calculates its own position in a suitable coordinate frame by measuring multiple distances to at least four transmitter stations, of which the position is known, to solve its unknown three-dimensional location and receiver clock. In contrast to GNSS, the transmitter stations of the invention are installed on any fixed or moving coordinates on the ground where the relative position between the ground segment transmitters has to be fixed. The distance measurement is typically performed on different measurement principles allowing for much less complex ground and user segment designs, with a much better distance measurement accuracy (e.g. RADAR).

When setting up one transceiver with one antenna and one receiver with one antenna, it is possible to determine the range between these two points with an accuracy better than 1 cm (one-dimensional ranging accuracy, 1-sigma) if, for example, typical RADAR technology frequency is considered. With at least four transmitters, it is possible to determine the position of a moving receiver relative to the transmitter stations. When equipping the receiver with two user antennas, it is possible to also determine the heading of the moving receiver relative to the transmit stations. With three user antennas the complete navigation information consisting of the relative three-dimensional position and attitude between receiver and transmitter stations can be derived. Always assuming that the attitude of the user segment is assisted by an inertial sensor input.

Due to the much less accurate GNSS signal distance estimation performance such attitude computation cannot be considered for standard GNSS concepts.

To optimize the local geometry within the near-field area and to ensure a most accurate and reliable navigation solution, more than four ground transmitters should be deployed. Measurement campaigns and analytical analyses have shown that a number of six transmit stations already exceeds typical navigation performance needs, e.g., for most demanding airborne landing use-cases (e.g. for UAV or helicopter landing).

Dependent on the targeted application, the invention is able to cover the complete spectrum, from one-dimensional distance measurement up to three-dimensional position and attitude determination. Also, large ground areas (e.g., landing strips) could be illuminated through consideration of several transmitters deployed according to the scenarios needs.

The following visualization explains the complete set-up, leading to three-dimensional position and attitude information, considering radio-frequency signals for the distance computation.

In the following sections the near field navigation system according to the invention is also referred to as "High-Precision Local Navigation System" (HP-LNS).

The ground-based transmitter stations ("Ground Station Units") each emit e.g., a Radio-Frequency signal within an area of up to 1 km using small hemispherical transmitting antennas. The lightweight, ruggedized receiver module 40 ("Range Measurement Unit") implements the processing unit 44 and receives these RF-signals with one to three antennas 41, 42, 43, calculates the distance from each ground-based transmitter station to each airborne antenna and forwards this raw information via a serial interface.

One of the goals of the HP-LNS system according to the invention is to be as modular and flexible as possible. Therefore, the pure range determination is separated from the positioning calculation and sensor hybridization. Depending on the needs of a particular application and equipment already available on the user side, the Range Measurement Unit can be fed as one sensor input into the onboard computer 22, where the positioning and eventually visualization is done.

The available information is typically merged within a sensor fusion algorithm capable of merging data from different positioning sources, like Inertial measurement data, altimeter data and GNSS information. Such a flexible algorithm can either run on a dedicated Positioning Calculation Unit (e.g., in the processing unit 44), or alternatively on any available onboard computer 22 inside.

This flexible overall design and suitable sensor fusion approach limits the impact on already available onboard equipment, which is essential e.g., within airborne applications.

The consideration of additional GNSS information allows for operation area extension and supports the guidance of an approaching vehicle or device into the reception area, either tightly coupled (sensor fusion) or independently implemented. In such combined consideration the invention could also be considered as high-precision backup system for the most critical period of a mission (e.g., close to touchdown in an airborne scenario), ensuring mission finalization in case of primary GNSS navigation system failure (e.g., due to local jamming of GNSS).

Detailed Design, Architecture, and Integration/Fusion

To ensure high flexibility the sensor-fusion algorithm is separated from the particular sensor input sources via dedicated interface handlers. This eases the adaption of the HP-LNS according to the invention into different user environments with different types of third-party altimeters or inertial systems already available.

Figure 3:
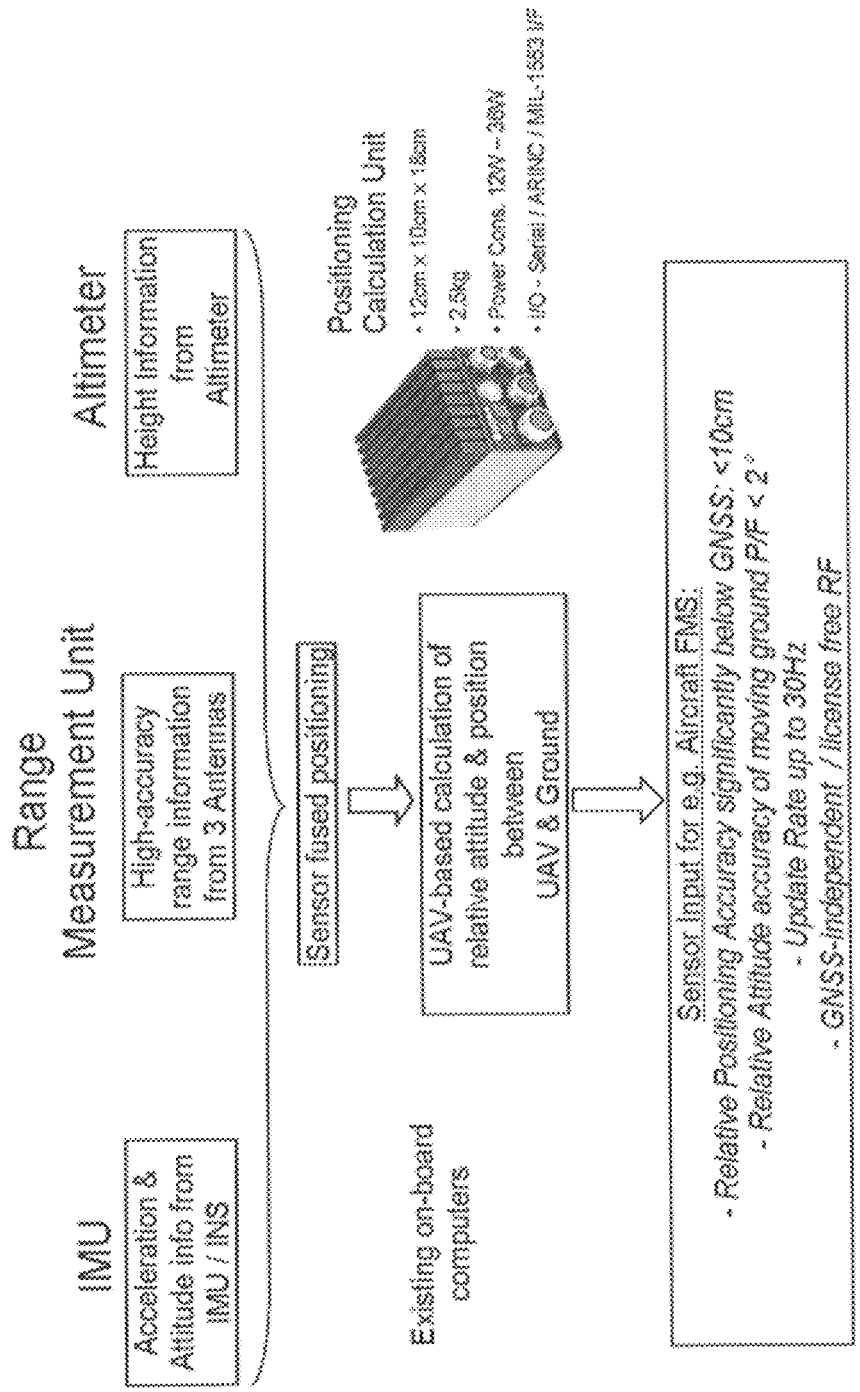
FIG. 3 is a schematic overview of the inventive near field navigation concept.

FIG. 3 shows a concept overview as an example how to achieve from ranges to sensor-fused position data.

As standard off-the-shelf equipment, the HP-LNS according to the invention is interfaced via serial links both on the sensor input side as well as on the range and positioning output side. An adaption of ARINC429/MilBus-1553 is foreseen and can be performed on demand without any hardware modifications.

Figure 4:
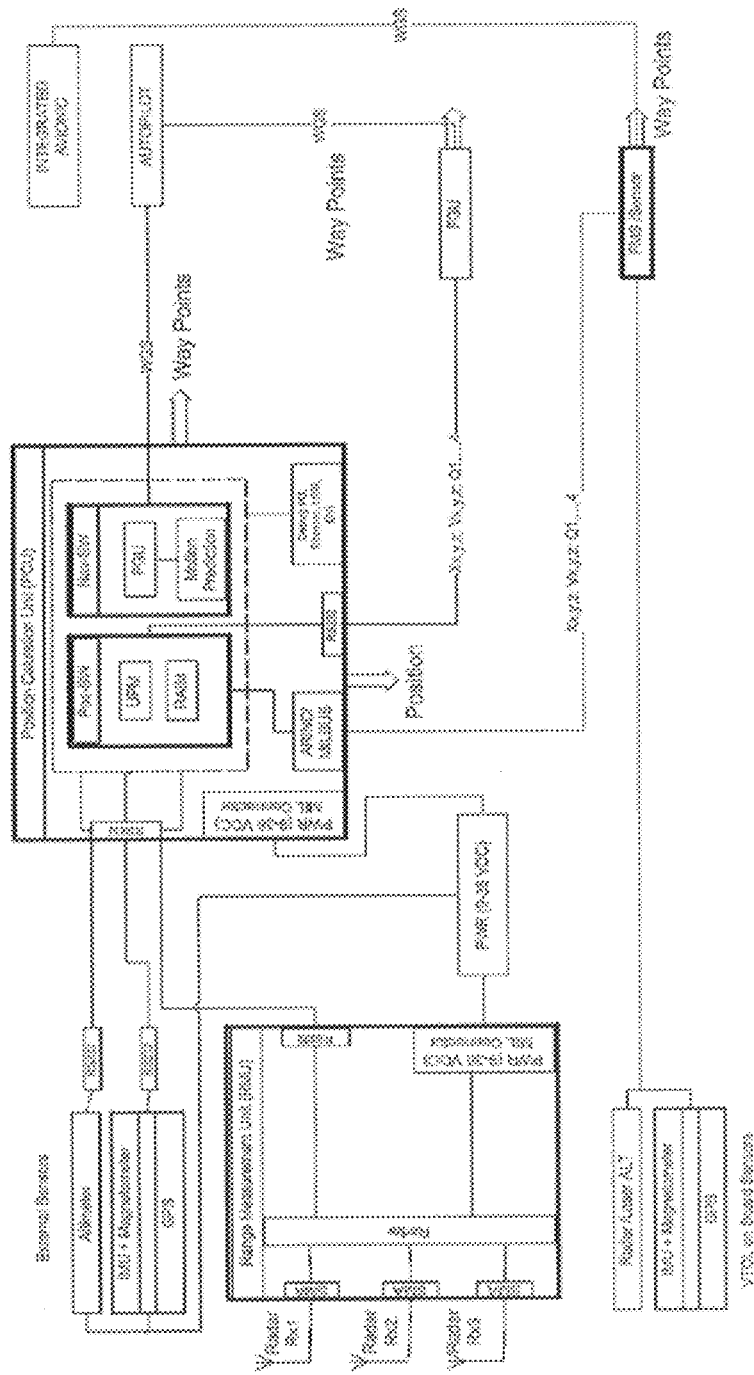
FIG. 4 is an example of hardware architecture of the invention.

FIG. 4 illustrates the different architectural options that can be considered for the invention.

The core of the HP-LNS according to the invention on the user side is the "Range Measurement Unit", where the ranges to the ground segment are determined and forwarded (radar based in FIG. 4). Additionally, if the system integrator on the user side is interested not only in the ranges to the ground, but also in a sensor-fused position and attitude, then a "User Positioning Module" (UPM) algorithm needs to be considered. This algorithm can either be run on the dedicated "Positioning Calculation Unit", or on any external available computer. For system integrators that are only interested in raw measurement data between ground and airborne segment (base and user segment) as additional input for their own hybridization, the "User Positioning Module" algorithm can be removed from the chain.

Through intelligent guidance software as part of the "Navigation-Software" subsystem listed inside the Positioning Calculation Unit algorithm, or suitable motion prediction software to predict e.g., ship-movements and deduct suitable automated UAV maneuvers, the overall system can be easily extended.

Figure 5:
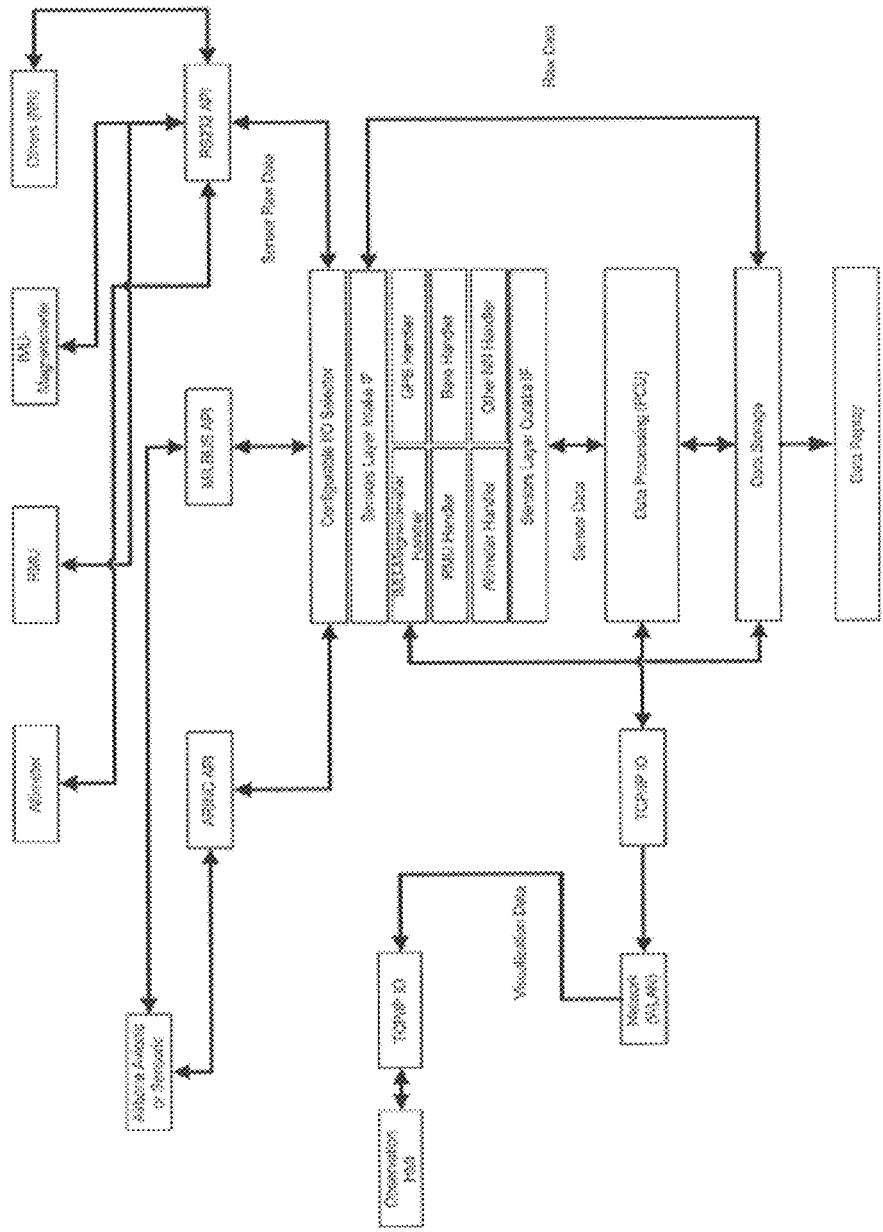
FIG. 5 is an example of software architecture for the inventive near field navigation system.

The diagram shown in FIG. 5 illustrates the modular software design of the HP-LNS according to the invention, which allows for fast adaption to any application using any type of existing sensors on serial or ARINC/MIL-standard links.

This software program is relevant for the full positioning algorithm within the invention. In case of "Range Measurement Unit" consideration only with own hybridization concept, this part of the invention is not required.

Navigation Information Visualization

To ensure appropriate guidance, e.g., for a pilot either onboard the vehicle or operating it on ground (e.g., in case of a UAV scenario) an appropriate display module visualizing the relevant parameters of the HP-LNS according to the invention in a style suitable without information overflow is mandatory. Such a module is separated from the "User Positioning Module" to allow for flexible integration, e.g., into typically available onboard displays.

Particularly for airborne consideration of the invention, like manned helicopter applications or UAV guidance, this aspect of suitable information provisioning including possible relative ground motion, heading, relative location to final target, etc. is of most critical importance, and needs to follow standard pilot visualization concepts. Thus, the focus on the most important information to display the relative offset of the vehicle to the intended landing or target spot together with vehicle height over target needs to be displayed. Additional heading, speed or absolute orientation information can also be integrated, but are of secondary importance and must not deflect the operator's attention.

Once started, the Visualization Module is fed with a data-rate optimized TCP/IP data stream from the vehicle (e.g., the helicopter or UAV), bringing in the actual parameters of the airborne user in real-time. This set-up saves processing power on the airborne computer and allows a flexible adaption of the visualization for any applications, not limited to a helicopter or UAV use-case. Variations of this display depending on the mission's needs are possible, but the general approach visualizing the vehicle's movement in relation to the ground target on the base segment and the related set of ground or base transmitters is also an aspect of the invention.

Figure 6:
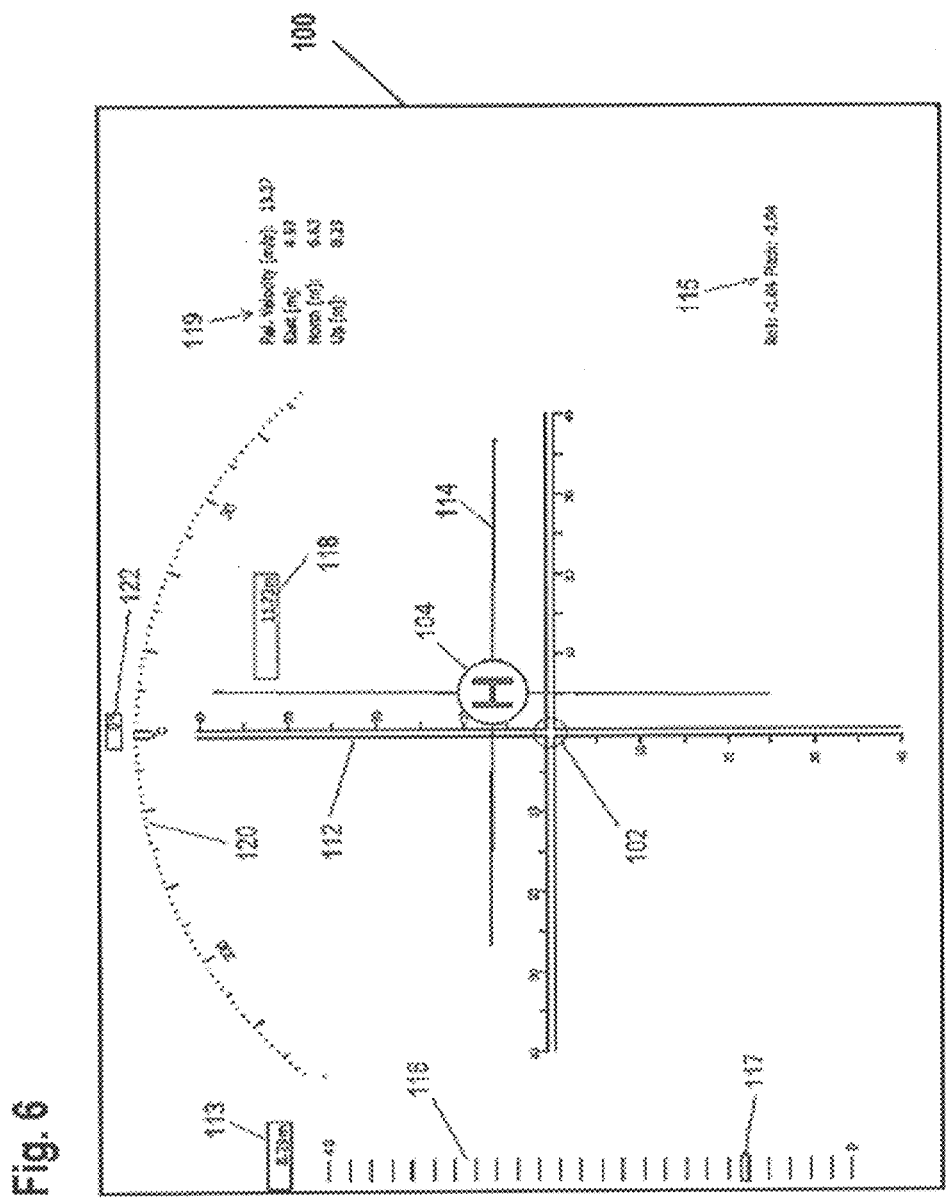
FIG. 6 is an example of a visual user interface for controlling the near field navigation system according to the invention.

Key aspects of this display 100 according to the invention as illustrated in FIG. 6 are the simultaneous visualization of the relative two-dimensional position 102 of the vehicle relative to the position of the target point 104, e.g., both represented through dedicated crosses 112, 114, together with the relative yaw offset between vehicle and target. If these positions are implemented through crosses 112, 114 this would allow an appropriate two-dimensional navigation of the moving vehicle by steering both crosses 112, 114 to a congruent configuration, without overwhelming the operator or pilot with too much information.

If the third dimension also needs to be considered, e.g., for helicopter approaches to a landing deck, this is visualized in a decoupled way from the two-dimensional location and orientation display, through typical vertical height scale 116 with current height mark 117, plus (if required) a relative height display 113 as a value in meters to the target point 104 within the two-dimensional view.

Further information 119 can be incorporated like heading, device or target speed, absolute location and/or orientation, etc. Such optional information is enabled or disabled directly by the pilot or user according to its personal preferences.

If pitch and roll information relative to the target or as absolute pitch and roll of the target itself shall also be visualized, this can be incorporated as pure values as illustrated at reference numeral 115 (favorable for non-moving targets), or through an additional three-dimensional plane/ground face horizon like display. The level of detail in such visualization again fully depends on the pilot's personal preference for the specific mission respectively scenario.

FIG. 6 illustrates a snapshot of the standard airborne visualization module considered for the HP-LNS according to the invention providing all required information in a suitable way, in conformity with typical pilot expectations.

In this exemplary case an Unmanned Aerial Vehicle (UAV) approaches a frigate flight deck. The approaching vehicle (user structure 20) is represented as the center 102 of a vehicle reference cross 112 also representing the reference coordinate system defining heading, yaw, pitch, roll, etc. Target cross 114 representing with its center 104 the landing spot on the flight deck 10 (base structure 12) moves relative to the vehicle reference cross 112 depending on the relative location and orientation between each other. Again, depending on the pilot's preferences, this selection of the reference system could also be changed to fix the target as the primary reference.

The important third dimension, at least in this UAV scenario, as height over target is incorporated on the left as height scale 116 over touchdown target with an appropriate mark 117, as well as absolute values 113 above the scale. There are several standard ways to visualize such changing height information (e.g., also with fixed center height and value, and transversal moving scale), which can be flexibly selected by the user. Furthermore, the absolute distance 118 to the target point is shown close to the central vehicle reference cross 112. A perfect congruent configuration of both crosses will show the same value as displayed on the left at 113 for the absolute height over target.

Furthermore, the heading of the vehicle is visualized above the central vehicle reference cross 112 as standard rotating compass rose 120 and value 122. If required (e.g., in case of moving targets), the target roll and pitch values, either absolute or relative to the vehicle, can also be visualized (e.g., at 115 on the right bottom in the above example). This can also be supported by a suitable horizon visualization, depending on the pilot's preferences. Also, any other information computed by the HP-LNS according to the invention can be incorporated, like relative or absolute velocities, etc.

Mobile Navigation System Consideration

Due to the flexible design of the HP-LNS according to the invention with the capability to implement the invention with small and easily deployable distance measurement units (e.g., based on RADAR technology), the HP-LNS can also be configured to support mobile missions. Such mobility can hereby vary between semi-mobile scenarios, like quick but rather fix deployment (with or without external transmitter power supply) on a roof of a building where a navigation system is required e.g., for a few says to land helicopters, until fully mobile environments where transmitters are dropped to the ground and are running in battery mode.

This fully mobile option requires a self-calibration capability of the ground or base units together with a suitable dissemination scheme of such information since the exact relative location cannot not be known a priori, but is required at user level for the location and orientation calculation relative to the distributed transmitters.

Several ways to self-calibrate a set of transmitters exist and can be followed, e.g., through coarse first location respectively trajectory estimation based on distance measurements between the deployed transmitters (e.g., based on Least Squares methods), followed by fine-tuned and optimized localization estimation within a suitable local reference frame, e.g., originated relative to one master transmitter.

Once the location of each transmitter within the local reference frame is known, such information is provided to any approaching user, e.g., through external data links or within the distance measurement signal, enabling its localization and orientation relative to the deployed transmitters.

Such deployment of autonomous transmitters, followed by a fast self-calibration and transmitter location information provisioning, enables the consideration of the invention as fully mobile relative high-precision navigation system, without the need for additional user adaptations. After a few minutes any user already equipped with the user segment of the present invention will be able to navigate within the service area of the near field navigation system according to the present invention.

Navigation System Performance in Suitable RADAR Configuration

The performance of the HP-LNS according to the invention has been tested, both on analytical simulation and analysis level, as well as in real through test and measurement campaigns within various realistic test-scenarios under real conditions.

As an example, the invention has been tested in a flight-test campaign where the equipment of a near field navigation system according to the present invention has been deployed on an unmanned aerial vehicle (UAV) while the ground segment was mounted on the ground in geometry deducted from a typical helicopter landing deck of a frigate. In this test campaign, a standard GPS single frequency receiver was used in parallel to assess the relative deviation of the invention from the standard GPS-only solution.

Figure 7:
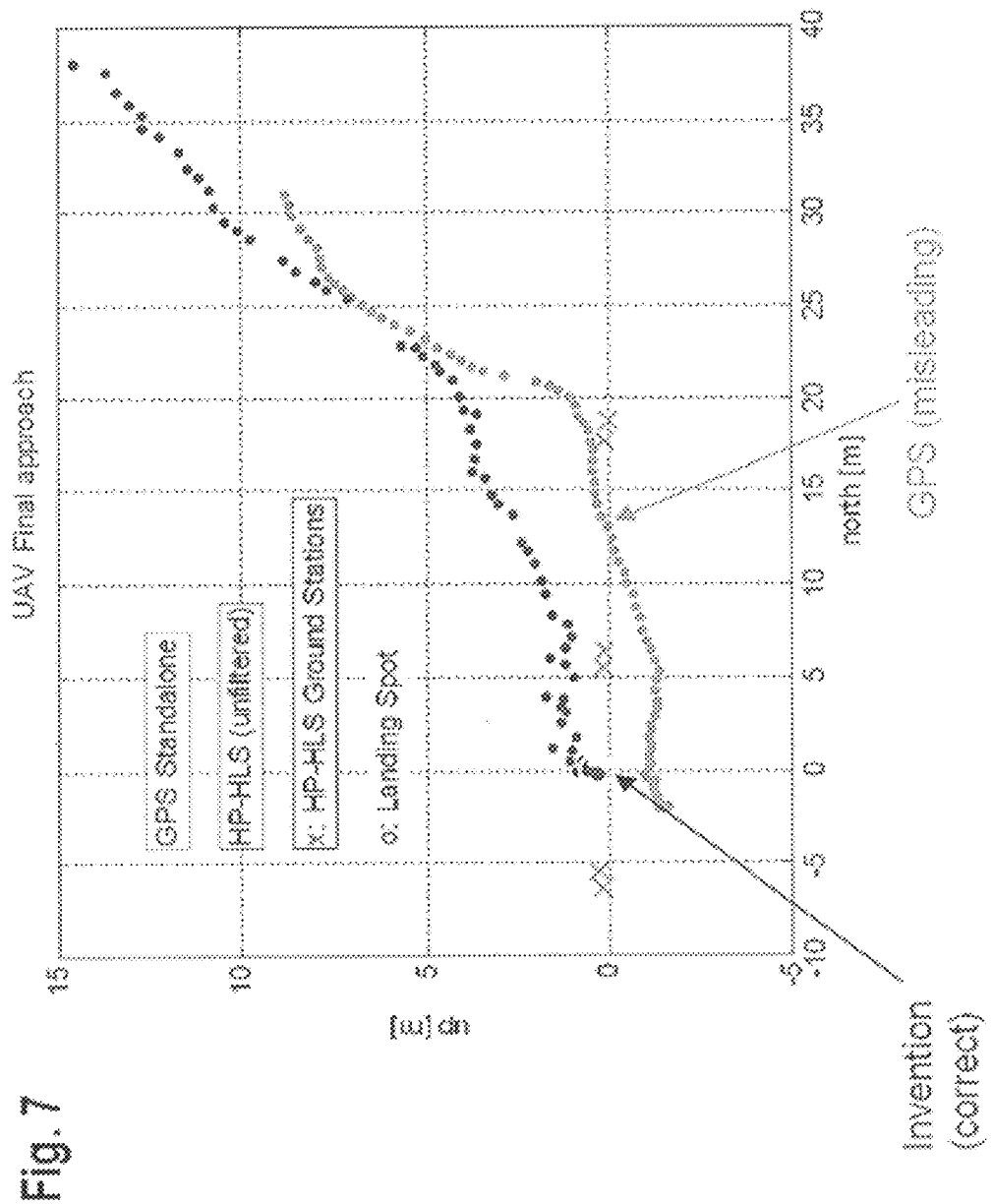
FIG. 7 is a chart showing the unfiltered position accuracy of the inventive near field navigation system vs. a GPS-based positioning system

During the flight tests the near field navigation system according to the present invention demonstrated a positioning performance of better than 10 cm (<5 cm 1-sigma), even under highly dynamic conditions, which is illustrated in FIG. 7.

While the position derived with the near field navigation system according to the present invention correctly displays the actual position of the UAV in the final approach phase, the single-frequency GNSS receiver has misleading deviations of up to 2.5 m from the actual position as determined in post-processed reference position.

After real-world measurement data of the invention's technology were available from the above described flight test-campaigns, the measured information have been used to perform additional analysis to extrapolate the measured performance to different, and more severe or worst-case scenarios. Pessimistic assumptions have been taken accordingly, and only worst-case values of the realistic sensor data were fed into the performed verification extrapolation analysis.

Figure 8:
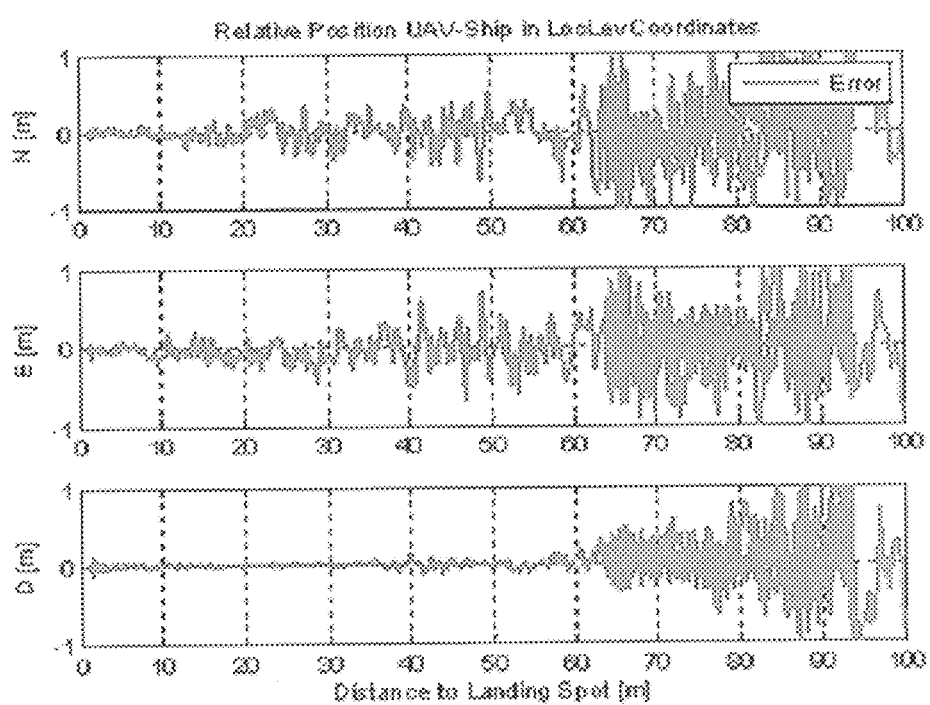
FIG. 8 is a chart showing the north, east and down error of a relative position determined by the near field navigation system according to the invention.

The plots shown in FIG. 8 demonstrate the performance of the near field navigation system according to the present invention in a scenario with the ground-segment installed in a geometrical area of 12 m×24 m as determined by the airborne Positioning Calculation unit. On the vehicle (UAV), three antennas were attached to the Range Measurement Unit with a distance of 1 m between the three antennas, which is considered minimum demanding from user installation point of view.

FIG. 8 illustrates the worst-case error of the invention for the scenario specified above.

The deviations in North, East, and down direction from the vehicle are illustrated over the distance to the analyzed landing spot.

Close to the touchdown point, when the distance of the user relative to the landing spot is below roughly 60 meters, the accuracy of the near field navigation system according to the present invention is significantly better than 50 cm in all axes, reaching a value of 10 cm within the last meters before touchdown. The position is thereby calculated in real-time with only minimal time-delays—a prerequisite for automated navigation in highly dynamic scenarios.

Due to three antennas and the Inertial Sensor on the airborne side, it is also possible to calculate the absolute attitude of the moving ground object inside the airborne Positioning Calculation Unit, using a Sensor-fusion Algorithm. The attitude determination accuracy in this scenario is always better than 2 degrees (below 0.5 deg 1-sigma), even in such a limited antenna distribution area with below 1 m antenna separation distance (not further illustrated in the drawings).

This information is deducted on the airborne side, without any additional sensors on ground and without the need to communicate such a ground-based sensor information to the vehicle (UAV), which would cause time-delays and would require an available communication link.

For applications requiring HP-LNS positioning information in a larger areas, different options apply depending on the required performances. If the constraints of the ground allow for a deployment of the ground or base station units in a larger area, the accuracy-degradation of the HP-LNS (near field navigation system) according to the present invention can be limited. For applications like "fixed wing UAV landing on temporary landing strips", or even HP-LNS technology consideration for standard runways, the number of transmitter stations alongside the runway can be increased to guarantee a performance in line with the requirements. With, for example, 10 to 12 ground transmitter units and considering 1.2 km signal reception range for a typical RADAR technology consideration within the invention as distance measurement source, typical airfields could be supported by the invention's technology with highest accuracy especially for the most critical part of the final approach.

Invention Use-Case and Service Spectrum

Due to its generic character of being a positioning sensor only with ground-based transmitters and also due to the modular architecture of the near field navigation system according to the present invention, it can enable any applications requiring highly accurate relative distance measurements or results based on mathematical operations using these distances. For advanced positioning and navigation tasks, hybridization with other sensor sources increases the spectrum of applications.

The invention is designed to enable various position-based applications accordingly, like:
  Automatic UAV landing on fixed or moving ground;
  Manned helicopter assistance for landing under challenging conditions;
  "Hovering-assistance": automated Helicopter or UAV hovering relative to moving ground platforms;
  Automated deck handling of helicopters and UAVs on a ship;
  Assistance for Helicopter people dropping and load carriage;
  Sensor for automated helicopter deck-handling;
  Back-up landing local positioning system in GNSS-denied environments (e.g. due to jamming);
  Relative positioning sensor for unmanned surface vehicle recovery;
  Sensor for oil and gas offshore operations: crane-control, ship docking assistance;
  Assistance system for "formation flying"; and
  Wherever highly accurate distances, position or attitude information is relevant and required.

A method and concept are described to consider at least four locally deployed distance measuring sensors/transmitters that are received by at least one receiver antenna to enable three-dimensional high-precision localization and orientation of vehicles or devices within the reception area of the ground or base sensors, relative to the ground or base sensors respectively to a local reference frame. For three-dimensional attitude estimation at least three user antennas are required.

Furthermore, a method to integrate the inventive concept and to combine it, if required, with additional sensor information like user altimeter data or inertial sensor is described, enabling suitable vehicle or device navigation until final target position also in case of a moving reference frame or moving transmitters.

A detailed concept and architecture with sets of options on how to implement these methods as full local high-precision navigation system are described.

A method on how to extend the range of the high-precision local navigation system through GNSS consideration to a regional system, allowing for appropriate guidance into the operating local area of the navigation system, or allowing for concept usage as GNSS backup system is also described.

A concept and method are described on how to integrate the invented concepts into standard onboard equipment to minimize the impact on the user segment, including onboard autopilot consideration and interfacing.

Another described aspect of this invention is the concept of visualization of the navigation information obtained from the near field navigation system according to the present invention in a compact way that is also suitable for pilots avoiding information overwhelming.

Finally, a concept to extend the field of consideration of the local navigation system to mobile missions through mobile and fast transmitter deployment including self calibration and local reference information transmission is an aspect of the present invention.

Reference numerals in the claims, in the description and in the drawings are provided only for a better understanding of the invention and shall not limit the scope of protection of the invention as defined in the appending claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS 1 vessel
2 helicopter
3 base segment
4 user segment
10 landing deck
12 base structure
20 user structure
22 flight computer
30 RADAR transmitter
30' an inter-transmitter distance measuring unit
30" global navigation satellite system receiver
31 RADAR antenna
31' transmitting unit
32 RADAR transmitter
32' an inter-transmitter distance measuring unit
32" global navigation satellite system receiver
33 RADAR antenna
33' transmitting unit
34 RADAR transmitter
34' an inter-transmitter distance measuring unit
34" global navigation satellite system receiver
35 RADAR antenna
35' transmitting unit
36 RADAR transmitter
36' an inter-transmitter distance measuring unit
36" global navigation satellite system receiver
37 RADAR antenna
37' transmitting unit
40, 40', 40" RADAR receiver
44 processing unit
46 position detecting unit
100 display
102 position of the vehicle
104 target point
112 reference cross
113 height display
114 target cross
115 pitch and roll information
116 height scale
117 height mark
118 absolute distance to the target point
119 further information
120 compass rose
122 heating value

What is claimed is:

1. A near field navigation system, comprising:
a first object comprising a user segment of the near field navigation system, the user segment having a plurality of receivers and a plurality of user antennas mounted on a user structure, wherein each of the plurality of user antennas is connected to one of the plurality of receivers, and wherein the user segment includes a processing unit connected to the plurality of receivers; and
a second object comprising a base segment of the near field navigation system, the second object having at least four transmitters, wherein each of the at least four transmitters is connected to one of a plurality of base antennas provided on a base structure of the second object, wherein the plurality of base antennas are positioned relative to each other at known distances, and wherein the first object moves relative to the second object,
wherein the receiver and each of the transmitters together form distance measuring units,
wherein at least a first one of the transmitters is provided with an inter-transmitter distance measuring unit that is configured to determine a distance between the base antenna of the first transmitter and the base antenna of at least one other transmitter of the base segment,
wherein the base segment comprises an inter-transmitter distance measuring control unit configured to control the inter-transmitter distance measuring unit,
wherein the inter-transmitter distance measuring control unit is provided in only one of the transmitters, which thus forms a master transmitter configured to transmit the determined inter-transmitter distance data to the user segment, and
wherein the processing unit of the user segment is configured to calculate a relative three-dimensional position data of the user structure with respect to the base structure on the basis of determined inter-transmitter distance data obtained from the master transmitter.

2. The near field navigation system according to claim 1, wherein the user segment comprises at least three receivers, wherein each receiver is provided with one of the user antennas and wherein the receivers are connected to the processing unit.

3. The near field navigation system according to claim 1, wherein
the transmitters are RADAR transmitters,
the plurality of receivers are RADAR receivers, or
the distance measuring units are RADAR-based distance measuring units.

4. The near field navigation system according to claim 1, wherein the inter-transmitter distance measuring unit of the at least one transmitter is a RADAR-based distance measuring unit.

5. The near field navigation system according to claim 1, wherein each one of the transmitters of the base segment is provided with a satellite navigation unit and wherein the absolute position data of each transmitter obtained from the satellite navigation units are transmitted to the user segment.

6. The near field navigation system according to claim 1, wherein the at least one transmitter is configured to transmit the determined inter-transmitter distance data together with a RADAR signal to the user segment or via a separate communication link to the user segment.

7. The near field navigation system according to claim 1, wherein the base segment is provided on the ground or on a mobile vehicle.

8. The near field navigation system according to claim 7, wherein the mobile vehicle is a naval vessel.

9. The near field navigation system according to claim 1, wherein the user segment is provided on a helicopter, a naval vessel, or an aircraft.

10. The near field navigation system according to claim 9, wherein the aircraft is an unmanned aerial vehicle.

11. The near field navigation system according to claim 1, wherein each transmitter of the base segment is powered by an autonomous power supply.

12. The near field navigation system according to claim 11, wherein the autonomous power supply is a battery.

13. The near field navigation system according to claim 1, wherein
the base segment or the user segment is provided with at least one additional position detecting unit, and
the processing unit is configured to also use the data obtained from the additional position detecting unit for calculating the absolute or relative three-dimensional position data of the user structure with respect to the base structure.

14. The near field navigation system according to claim 13, wherein the additional position detecting unit is an altimeter unit, inertial measurement unit, or a global navigation satellite system position detecting unit.

* * * * *